United States Patent [19]

Ikenoya et al.

[11] 4,434,615

[45] Mar. 6, 1984

[54] EXHAUST GAS CLEANING DEVICE OF INTERNAL COMBUSTION ENGINES

[75] Inventors: Yasuo Ikenoya, Kawagoe; Yoichi Ishida, Niiza, both of Japan

[73] Assignee: Honda Giken Kogyo Kabushiki Kaisha, Tokyo, Japan

[21] Appl. No.: 342,429

[22] Filed: Jan. 25, 1982

[30] Foreign Application Priority Data

Jan. 23, 1981 [JP] Japan ................................. 56-9378

[51] Int. Cl.$^3$ .............................................. F01N 3/30
[52] U.S. Cl. ....................................... 60/293; 60/305; 180/219
[58] Field of Search .................. 60/293, 305; 180/219, 180/291

[56] References Cited

U.S. PATENT DOCUMENTS

| 2,295,436 | 9/1942 | Tendler | 60/305 |
| 2,544,605 | 3/1951 | Mallory | 60/305 |
| 4,154,058 | 5/1979 | Mase | 60/293 |

FOREIGN PATENT DOCUMENTS

| 2547450 | 4/1977 | Fed. Rep. of Germany | 60/293 |
| 55-151114 | 11/1980 | Japan | 60/293 |
| 55-161912 | 12/1980 | Japan | 60/293 |

Primary Examiner—Douglas Hart
Attorney, Agent, or Firm—Armstrong, Nikaido, Marmelstein & Kubovcik

[57] ABSTRACT

An exhaust gas cleaning device of an internal combustion engine, comprising a secondary-air supply system connected to exhaust ports to supply the secondary air for cooling the exhaust gas, and reed valve devices installed in the secondary-air supply system and adapted to be opened and closed by the pulsating pressure generated in the exhaust ports when the engine is in operation. The reed valve devices are mounted on the side surface of the cylinder block, each of which has a reed valve chamber and a reed valve that divides the reed valve chamber into an upstream chamber and a downstream chamber and that is adapted to be opened and closed by the pulsating exhaust gas. The upstream chamber is communicated with the open air via a secondary-air intake pipe, and the downstream chamber is connected to the exhaust port via a secondary-air supply passage. The exhaust gas cleaning device is simply constructed so that its maintenance is easy and the presence of the device does not hinder maintenance operation for the internal combustion engine such as replacement of spark plugs, adjustment of tappets, and the like.

10 Claims, 9 Drawing Figures

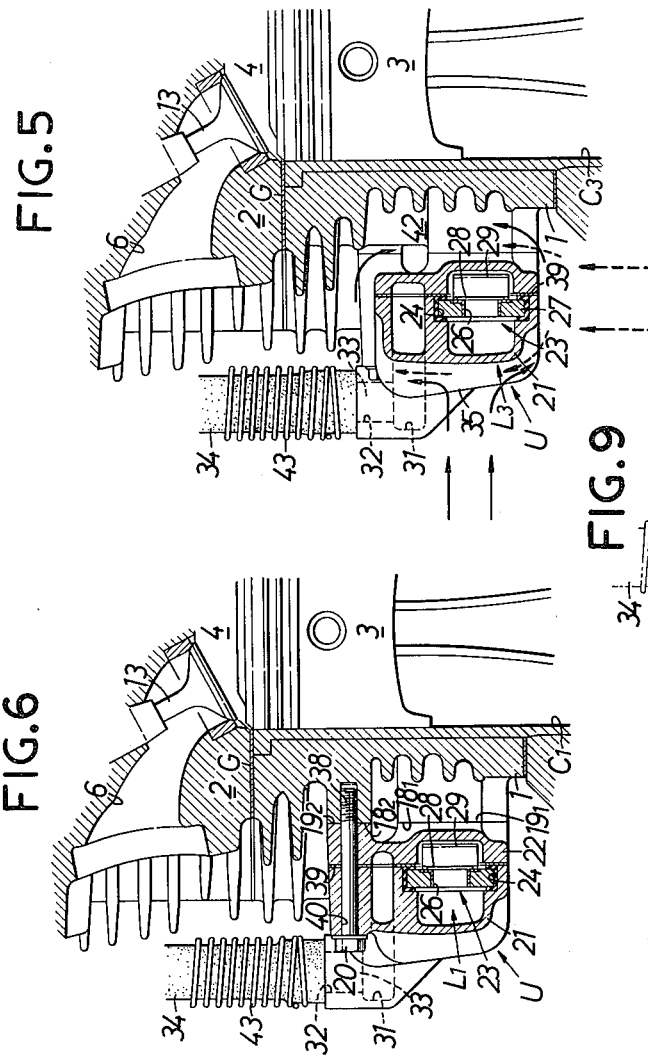
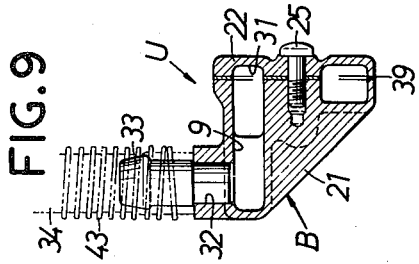

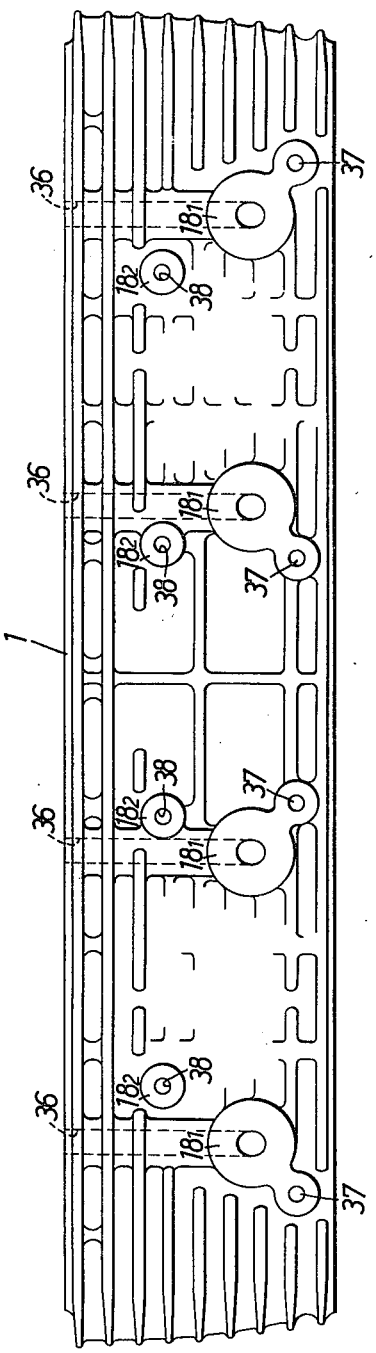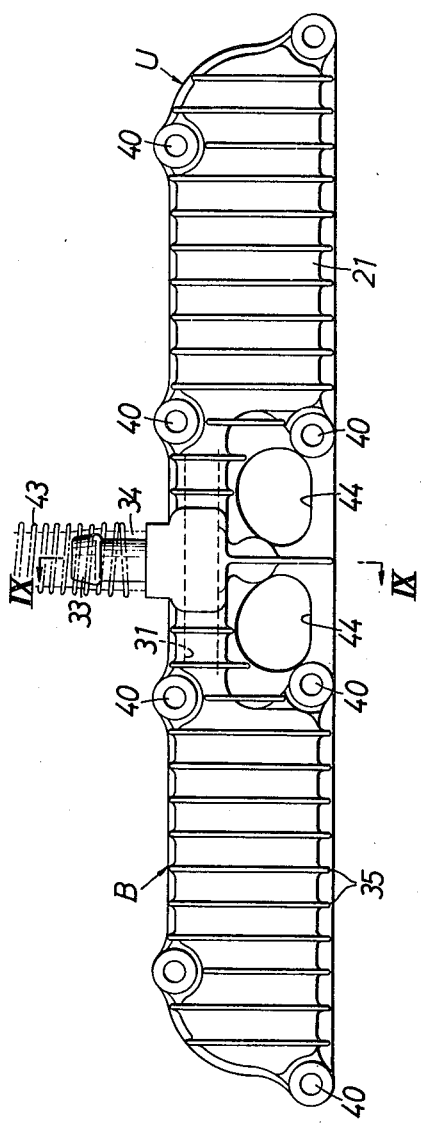

EXHAUST GAS CLEANING DEVICE OF INTERNAL COMBUSTION ENGINES

BACKGROUND OF THE INVENTION

1. Field of the Invention

The present invention relates to an exhaust gas cleaning device of an internal combustion engine in which secondary air is supplied into the exhaust system of an internal combustion engine to oxidize and remove unburnt noxious components such as hydrocarbons and carbon monoxide contained in the exhaust gas flowing through the exhaust system.

2. Description of the Prior Art

A conventional exhaust gas cleaning device of the above kind is known as having such a structure that a secondary-air supply system is in communication with the exhaust system of an internal combustion engine and a reed valve device is provided in the secondary-air supply system to be opened and closed by the operation of the internal combustion engine to introduce the secondary air into the exhaust system, whereby unburnt noxious components such as hydrocarbons and carbon monoxide in the exhaust gas are removed. When the above-mentioned exhaust gas cleaning device is mounted on the internal combustion engine, however, cumbersome maintenance is required not only for the device itself but also for the internal combustion engine. For instance, replacement of spark plugs and adjustment of tappets are hindered by such mounting of the cleaning device. Furthermore, complicated construction raises the manufacturing costs.

When the reed valve device is directly mounted on the engine, the device is subject to be affected by the heat of combustion of the engine, whereby deterioration of components of the device due to heat is accelerated to lower their durability. Further, with deteriorated components, the reed in the reed valve device produces increased striking noises as it opens and closes.

When the operation of the engine is stopped, on the other hand, the reed valve device is gradually cooled and the interior of the reed valve chamber often reaches a dew point. Here, the burnt gas flows reversely from the exhaust port into the reed valve chamber. In this case, moisture formed by the combustion of fuel and contained in the burnt gas is coagulated in the reed valve chamber of which the temperature has reached the dew point. As the coagulated water builds up in the flow passage of the secondary air, flow resistance of the secondary air increases to decrease the flow rate of the air. Further, in case an engine has a multiplicity of cylinders, the secondary air may be distributed in unequal amounts into the exhaust systems that are connected to the cylinders.

SUMMARY OF THE INVENTION

The object of the present invention is to provide an exhaust gas cleaning device of internal combustion engines, which has a simple structure to eliminate the above mentioned deficiencies.

According to the present invention, there is provided an exhaust gas cleaning device of an internal combustion engine which has intake and exhaust ports, a cylinder block and a cylinder head, the improvement comprising:

a secondary-air supply system connected to said exhaust port and supplying the secondary air thereto to purify the exhaust gas;

reed valve means provided in the secondary-air supply system for opening and closing operations in response to the pulsation of exhaust gas that is generated in said exhaust port when the engine is in operation, said reed valve means being mounted on a side surface of said cylinder block and having an inlet passage and an outlet passage;

a secondary-air intake pipe communicating said inlet passage with the atmosphere; and a secondary-air supply passage which is formed in said cylinder block and in said cylinder head, connecting said outlet passage to said exhaust port.

The above and other objects, features and advantages of the present invention will become apparent from the following detailed description of a preferred embodiment when taken in conjunction with the accompanying drawings.

BRIEF DESCRIPTION OF THE DRAWINGS

FIG. 5 is a section view taken along the line V—V of FIG. 2;

FIG. 6 is a section view taken along the line VI—VI of FIG. 2;

FIG. 7 is a front view of the cylinder block;

FIG. 8 is a front view showing the unit of a reed valve device; and

FIG. 9 is a section view taken along the line IX—IX of FIG. 8.

DESCRIPTION OF THE PREFERRED EMBODIMENT

Description will now be made of an embodiment in conjunction with the drawings wherein the device of the present invention is adapted to an air-cooled OHC-type 4-cylinder in-line internal combustion engine E which is mounted on a motorcycle.

Figure 1:
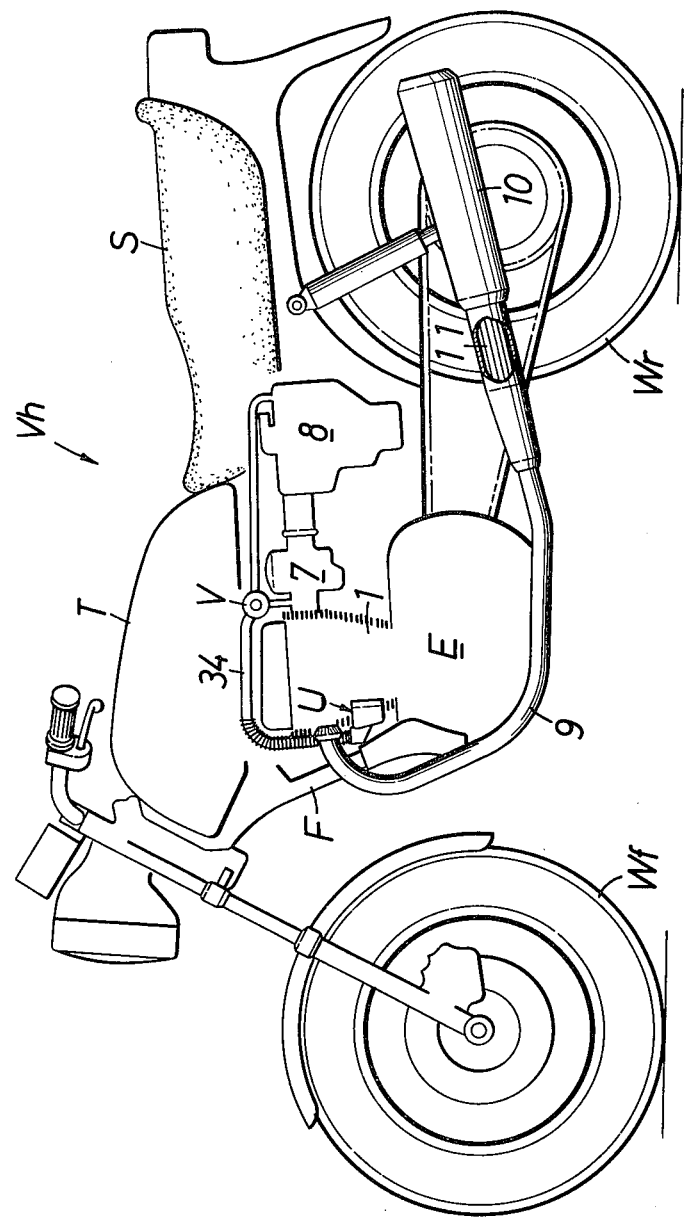
FIG. 1 is a side view of a motorcycle mounting an internal combustion engine which is equipped with a device of the present invention.

In FIG. 1, a fuel tank T and a seat S are mounted on the upper portion of the vehicle frame F of a motorcycle Vh, and a front wheel Wf and a rear wheel Wr are supported at the front and rear portions of the frame. The internal combustion engine E for driving the rear wheel Wr is mounted on the vehicle frame F in a space defined by the above-mentioned members.

Figure 2:
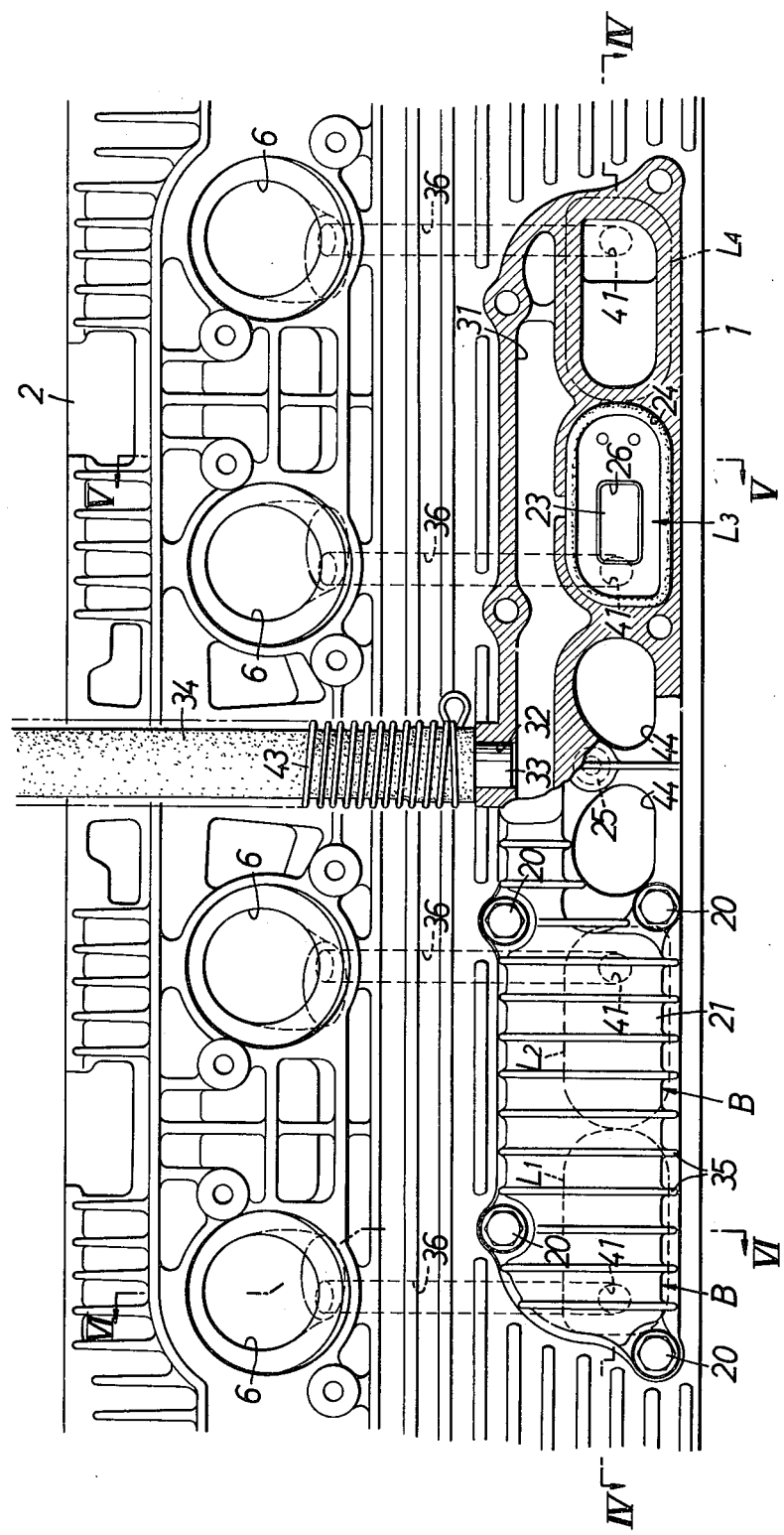
FIG. 2 is a partly cut-away front view of the internal combustion engine.
Figure 3:
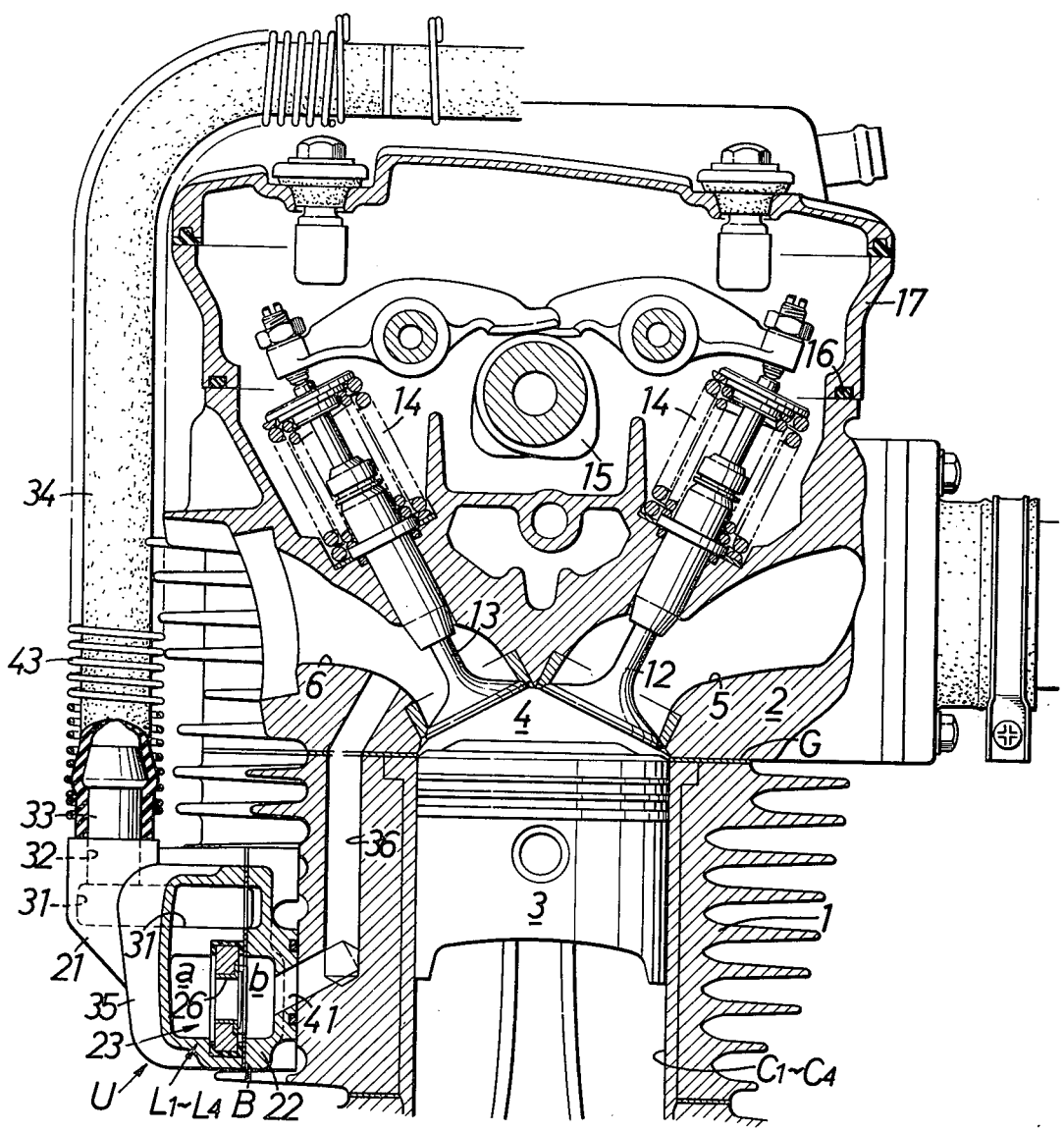
FIG. 3 is a cross sectional side view of a head portion of the internal combustion engine.
Figure 4:
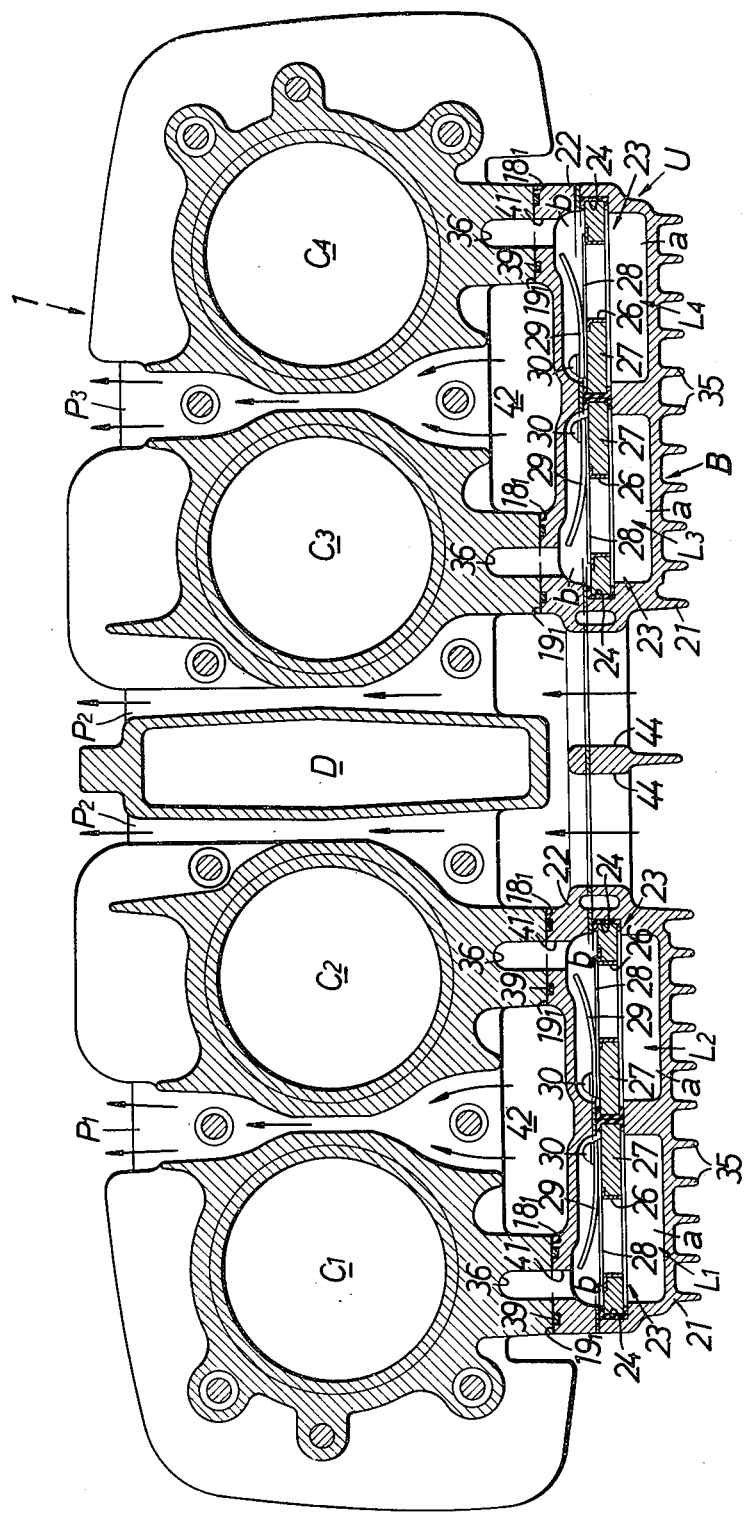
FIG. 4 is a section view taken along the line IV—IV of FIG. 2.

In FIGS. 2 to 4, a cylinder block 1 of the 4-cylinder in-line internal combustion engine E has four cylinders $C_1$, $C_2$ and $C_3$, $C_4$ that are arrayed in line on both sides of a portion D (FIG. 4) which accommodates a cam axis transmission mechanism. A piston 3 is slidably fitted in each of the cylinders. A cylinder head 2 is secured onto the cylinder block 1 via a gasket G, and a combustion chamber 4 is formed in the cylinder head 2 on each of the pistons 3.

Intake ports 5 are arrayed on the back side of the cylinder head 2 and are communicated with the combustion chambers 4. Exhaust ports 6 are arrayed on the front side of the cylinder head 2 and are communicated with the combustion chambers 4.

The intake ports 5 are opened in the back surface of the internal combustion engine E, and the exhaust ports 6 are opened in the front surface of the internal combustion engine E. As shown in FIG. 1, an intake system consisting of carburetors 7, air cleaner 8, and the like which are located behind the internal combustion engine E, is connected to the intake ports 5. Further, an exhaust system consisting of exhaust pipes 9, mufflers 10, and the like is connected to the exhaust ports 6, and a catalytic converter 11 is accommodated in the muffler 10 for cleaning the exhaust gas. The cylinder head 2 is equipped with intake and exhaust valves 12, 13 which open and close the opening ends of intake and exhaust ports 5, 6 on the side of combustion chambers 4. The valves perform opening and closing operations relying upon the cooperative motion of valve springs 14 and valve-drive cams 15. A spark plug (not shown) is screwed into the cylinder head 2 so that the electrodes thereof are exposed in the combustion chamber between the intake valve 12 and the exhaust valve 13.

A cylinder head cover 17 is attached to the upper portion of the cylinder head 2 via a packing 16.

A reed valve means consisting of four reed valve devices $L_1$, $L_2$, $L_3$ and $L_4$ is provided on the front surface of the cylinder block 1, i.e., on the front side of the motorcycle, these reed valve devices corresponding to the four cylinders $C_1$, $C_2$, $C_3$ and $C_4$.

The reed valve devices $L_1$, $L_2$, $L_3$ and $L_4$ are mounted in the form of a unit U shown in FIGS. 8 and 9 on the mounting surfaces $18_1$, $18_2$,—(FIG. 7) by using mounting bolts 20, 20,—which surfaces are outwardly protruded from the front side surface of the cylinder block 1.

Construction of the unit U of reed valve devices $L_1$ to $L_4$ is explained below. The unit U has four reed valves 23, 23,—that are held between a valve cover 21 and a valve case 22 forming a valve box B. The valve cover 21 has recessed portions 24, 24,—which accommodate the reed valves 23, 23,—therein. The valve case 22 is fitted onto the valve cover 21; the valve cover 21 and the valve case 22 are fastened together as a unitary structure by fastening bolts 25 (FIG. 9) that penetrate therethrough. An end portion of the reed valve 23 is fastened by a screw 30 to a valve seat 27 which has a valve port 26 in the central portion thereof, being overlapped on a reed 28 which opens and closes the valve port 26 and a reed stopper 29 which restricts the opening degree of the reed 28. The reed valve 23 divides each of the four reed valve chambers formed in the valve box B into an upstream chamber a and a downstream chamber b, and the valve port 26 of valve seat 27 communicates the upstream chamber a with the downstream chamber b. As best shown in FIG. 2, a secondary-air distributing path 31 is formed on the valve box B over the whole length thereof, and is communicated with the upstream chambers a, a,—via communication paths 45, 45,—formed in the upper wall of the upstream chambers a, a,—. The secondary air which flows through the secondary-air distributing path 31 is supplied into the upstream chambers a, a,—through communication paths 45, 45,—. An inlet path 32 (FIGS. 2 and 9) communicated with the secondary-air distributing path 31 is formed in the upper central portion of the valve box B. A connection joint 33 is connected to the inlet path 32, and a secondary-air introduction path 34 consisting of a flexible and elastic pipe such as rubber pipe is connected to the connection joint 33. A plurality of flat mounting surfaces $19_1$ (FIG. 4), $19_2$ (FIG. 6) are formed in the inner surface of the valve case 22 which constitutes a portion of the valve box B. Outlet paths 41, 41 (FIG. 4) are formed in the mounting surfaces $19_1$,—and are communicated with the downstream chambers b. A multiplicity of cooling fins 35 are protruded from the front surface of the valve cover 21 that constitutes another portion of the valve box B, being spaced apart in the transverse direction and being oriented in the vertical direction. The cooling fins 35 effectively cool the valve box B.

Flat mounting surfaces $18_1$, $18_2$,—(FIG. 7) are formed in a protruded manner on the front side surface of the cylinder block 1 to mount the unit U which contains the reed valve devices $L_1$ to $L_4$. One end of a secondary-air supply path 36 is opened in each of the mounting surfaces $18_1$. The secondary-air supply paths 36 run through the cylinder block 1 and through the cylinder head 2, and the ends on the other side are communicated with the exhaust ports 6 in the vicinity of the combustion chambers 4. The portion of the secondary-air supply path 36 which spans between the cylinder block 1 and the cylinder head 2 is air-tightly sealed by the gasket G. Bolt holes 37, 38 are punched through the mounting surfaces $18_1$, $18_2$,—, and bolt insertion holes 40 that come into agreement with the bolt holes 37, 38 are punched through the mounting surfaces $19_1$, $19_2$.

Mounting surfaces $19_1$, $19_2$ of the unit U containing reed valve devices $L_1$ to $L_4$, i.e., mounting surfaces $19_1$, $19_2$ of the valve case 22 are joined, via O-shaped ring 39, to the mounting surfaces $18_1$, $18_2$ on the front side surfaces of the cylinder block 1. Mounting bolts 20, 20,—are screwed into bolt holes 37, 38,—of the cylinder block 1 through bolt insertion holes 40, 40,—, such that the valve box B is secured to the cylinder block 1. Here, output paths 41, 41,—of downstream chambers b of the reed valve devices $L_1$ to $L_4$ in the valve box B are communicated with the secondary-air supply paths 36, 36,—.

Air-flow gaps 42 that are open in the upper and lower directions are formed between the front side surface of the cylinder block 1 and the inner surface of the valve box B having therein reed valve devices $L_1$ to $L_4$, as shown in FIGS. 4 and 5, and flow holes 44, 44 are also formed in the central portion of the valve box B in the back-and-forth direction as shown in FIGS. 2, 4, and 8.

Further, as clearly shown in FIG. 4, cooling paths $P_1$, $P_2$ and $P_3$ are formed among the neighboring cylinders $C_1$, $C_2$; $C_2$, $C_3$; and $C_3$, $C_4$ of the cylinder block 1, running in the back-and-forth direction of the cylinder block 1, and are communicated with the air-flow gaps 42.

The lower end of the secondary-air introduction path 34 formed of a flexible and elastic pipe such as rubber pipe or synthetic resin pipe, is connected to the connection joint 33 that is connected to the upper central portion of the valve box B. The introduction path 34 extends upwards along the engine E, runs rearwards on the engine, and is communicated with the air-cleaning chamber of air cleaner 8 via an air control valve V (FIG. 1). The air control valve V is a conventional one, and is adapted to open and close in response to the intake negative pressure in the intake system when the internal combustion engine E is in operation.

The circumference of the secondary-air introduction path 34 is protected by a helically wound metallic wire 43.

Operation of the thus constructed embodiment of the present invention will be described hereinafter.

If now the internal combustion engine E is operated, pulsating pressure of exhaust gas is generated in the exhaust ports 6. The pulsating pressure passes through the secondary-air supply paths 36 and reaches the reed valves 23 to open and close them. Further, owing to the valve-opening operation of the air control valve V when the engine E is in operation, part of the clean air in the air cleaner 8 passes through the secondary-air introduction path 34, and flows into the valve box B of the reed valve devices $L_1$ to $L_4$. The secondary air which has entered into the valve box B flows into the four upstream chambers a via secondary-air distributing path 31, flows into the downstream chambers b through valve ports 26 of reed valves 23, and then flows into the exhaust ports 6 through secondary-air supply paths 36 formed in the cylinder block 1 and in the cylinder head 2. The secondary air introduced into the exhaust port 6 is mixed into the exhaust gas, and oxidizes unburnt noxious components such as hydrocarbons and carbon monoxide contained in the exhaust gas in the exhaust ports 6 and in the exhaust pipes 9. The exhaust gas admixed with the secondary air further flows into the muffler 10 to promote the reaction of the catalytic converter 11 accommodated therein. After the unburnt noxious components are finally purified, the exhaust gas is emitted into the open air.

As the motorcycle runs being powered by the internal combustion engine, part of the air stream passes along the front surface of valve box B of the unit U containing reed valve devices $L_1$ to $L_4$ as indicated by solid arrows in FIGS. 4 and 5, divided into an upper stream and a lower stream. The divided streams flow along the upper and lower surfaces and pass through the gaps 42 defined by the back surfaces of the valve box B to cool the reed valve devices $L_1$ to $L_4$. Thereafter, the streams flow rearwardly through cooling paths $P_1$, $P_2$ and $P_3$ formed among the cylinders $C_1$, $C_2$; $C_2$, $C_3$; $C_3$, $C_4$ of the cylinder block 1. Another part of the air stream flows through the holes 44, 44 formed at the central portion of the unit U, and flows rearwardly through the cooling paths $P_1$, $P_2$, $P_3$ of the cylinder block 1 thereby to effectively cool the cylinder block 1.

When the motorcycle is not running and the internal combustion engine E is in idling operation, the rising air stream created by the heat of the engine E upwardly flows along the front and back surfaces of the valve box B as indicated by dotted arrows in FIG. 5 to effectively cool the reed valve devices $L_1$ to $L_4$ in the valve box B. In this case, the multiplicity of cooling fins 35 arrayed in the vertical direction so guide the rising air stream that it flows along the outer surfaces of the valve box B to enhance the heat-radiating efficiency of the valve box B. Therefore, the reed valve devices $L_1$ to $L_4$ in the valve box B can be effectively cooled, and the parts thereof can be prevented from being deteriorated by the heat. Furthermore, striking noise of reeds 28 in the reed valves 23 can be effectively suppressed since such noise is due to the deterioration of the parts.

As the multi-cylinder internal combustion engine E is cooled after its operation has been stopped, the reed valve devices $L_1$ to $L_4$ in the unit U are also cooled and the temperature in the reed valve chamber may reach the dew point. In this case, the water vapor contained in the air in the reed valve chamber may coagulate. In particular, water formed by the fuel combustion is contained in the combustion gas that reversely flows from the exhaust port 6 into the reed valve chamber; the water vapor cooled to dew point coagulates in the reed valve chamber to form water. If the coagulated water builds up in the secondary-air flow path in the reed valve chamber, the sectional area of the path decreases and the air resistance increases. Therefore, the flow rate of the secondary air tends to be reduced, and the difference of flow resistance increases between the reed valves located close to the secondary-air source and the reed valves remote from the secondary-air source, resulting in that the secondary air is supplied in unequal amounts. According to the present invention, however, the secondary-air distributing path 31 is formed on the upper side of the upstream chambers a, a,—of the reed valve devices $L_1$ to $L_4$ so that the water coagulated in the reed valve chambers flows through the secondary-air distributing path 31 and paths 45 and is stored in the plurality of upstream chambers a, a,—. When the internal combustion engine E is started again, therefore, the negative pressure generated in the exhaust ports 6 acts on the reed valve devices $L_1$ to $L_4$, whereby the coagulated water stored in the upstream chambers is sucked by the exhaust ports 6 and is emitted into the open air through exhaust pipes 9. That is, no water stays in the reed valve chambers.

To summarize, the present invention presents such advantages as mentioned below.

Reed valve means of the exhaust gas cleaning device is disposed in dead space formed sideward of the cylinder block of the internal combustion engine, and is fastened to the side surface of the cylinder block. This arrangement allows easy maintenance of the reed valve means itself. Further, the presence of reed valve means does not interrupt such maintenance operations as replacement of spark plugs, adjustment of tappets and the like. In addition, the reed valve means protrudes little beyond the contour of the cylinder head of the engine, interfering with no other units. Further, sufficient gap can be formed between the side surface of the cylinder block and reed valve means to effectively cool reed valve means so that components of the reed valve means are less deteriorated than the conventional ones, offering a prolonged service life of the means.

The outlet path of reed valve means is communicated with an end of the secondary-air supply path formed in the cylinder block and cylinder head of the internal combustion engine while the other end of the secondary-air supply path is communicated with the exhaust ports. The distance is short between the reed valve means and the exhaust ports. Therefore, the secondary air can be supplied in suitable amounts with reduced flow resistance from the reed valve means to the exhaust ports. Hence, the efficiency for purifying the exhaust gas is heightened. Moreover, no conduit is required between the reed valve means and the exhaust ports, eliminating such a trouble that the conduits are accidentally removed.

If the reed valve means is mounted on the front surface of cylinder block of the internal combustion engine which is mounted on the motorcycle, furthermore, the air stream created by the running of motorcycle effectively cools the reed valve means. Besides, the outwardly exposed reed valve means does not interfere with other units.

The coagulated water stored in the reed valve devices of reed valve means flows into the upstream chambers through the secondary-air distributing path, and is positively sucked and drained by the negative pressure generated in the exhaust ports when the multi-cylinder type internal combustion engine is started again. In other words, the coagulated water does not remain in the secondary-air paths of reed valve devices. Accordingly, the feeding rate of the secondary air is not decreased, and the uniform distribution of the secondary air into the reed valve devices is not disturbed, either.

Further, air-flow gaps are formed between the side surface of the cylinder block and the opposing surfaces of valve box which accommodates reed valve devices. With this arrangement, the periphery of the valve box is open to the atmosphere in spite of its direct attachment to the engine, i.e., on the cylinder block. The reed valve devices are cooled very efficiently, and the components of the devices are kept from deterioration by the heat, and the service life of the device can be extended. Moreover, striking noise produced by the opening and closing operations of the reed valve devices can be effectively reduced.

Furthermore, mounting surfaces are protruded on the side surface of the cylinder block and are also formed on the inner surface of the valve box containing reed valve devices, and by fitting these surfaces to each other, the reed valve devices are mounted on the cylinder block. Thus, the assemblability of reed valve devices onto the cylinder block is remarkably improved and a rigid mounting thereof enabled.

Moreover, a flexible and elastic pipe such as rubber pipe is utilized to form the secondary-air intake pipe communicated with outlet paths of the reed valve devices that are disposed in the secondary-air supply system of the exhaust gas cleaning device. Therefore, the secondary-air intake pipe can be arrayed at any desired position along the internal combustion engine, requiring only a simple assembling operation.

Further, since a metallic wire is helically wound around the outer periphery of the secondary-air intake pipe, heat-resistance of the pipe can be greatly increased without losing flexibility. Even when disposed close to the engine, therefore, the secondary-air intake pipe is less affected by the heat of combustion. Additionally, the secondary-air intake pipe protected by the metal wire is not subject to be damaged even when hit by obstacles such as flying stones. Namely, it is possible to cheaply obtain the secondary-air intake pipe which, as a whole, has a very high durability.

What is claimed is:

1. An exhaust gas cleaning device for an internal combusion engine, said engine having intake and exhaust ports, a cylinder block, a cylinder head and a valve operating mechanism mounted on an upper portion of said cylinder head, said exhaust port opening at the front surface of said cylinder head and an exhaust pipe connected to the opening of said exhaust port and extending downwardly in front of the engine, said exhaust gas cleaning device comprising:
a secondary-air supply system connected to said exhaust port for supplying secondary air thereto for purifying the exhaust gas;
reed valve means connected in the secondary-air supply system, said reed valve means being adapted to be opened and closed by the pulsation of exhaust gas generated in said exhaust port during engine operation, wherein said reed valve means is mounted on the front side surface of said cylinder block, below said exhaust port and said valve operating mechanism, said reed valve means having an inlet passage and an outlet passage;
a secondary-air intake pipe connecting said inlet passage to the atmosphere; and
a secondary-air supply passage formed in said cylinder block and in said cylinder head for connecting said outlet passage to said exhaust port.

2. A device as set forth in claim 1, wherein said reed valve means comprises reed valve chambers and reed valves dividing each of said reed valve chambers into an upstream chamber and a downstream chamber, said reed valves being opened and closed by the pulsating exhaust gas, and wherein said inlet passage is open to said upstream chamber, and said outlet passage is open to said downstream chamber.

3. A device as set forth in claim 2, further comprising a secondary-air distributing passage above said upstream chambers in order to connect said inlet passage to said secondary-air supply passage.

4. A device as set forth in claim 2, wherein a valve box is provided separately from said engine, and is attached to the side surface of said cylinder block, said valve box accommodating said reed valve devices and having a plurality of cooling fins that stretch on the outer surface thereof in the vertical direction.

5. A device as set forth in claim 4, further comprising one set of mounting surfaces formed in a protruded manner on the side surface of said cylinder block, another set of mounting surfaces integrally formed on the inner surface of said valve box in an opposite relation and attachable manner to said one set of mounting surfaces, and air-flow gaps defined between opposing surfaces of said cylinder block and said valve box.

6. A device as set forth in any one of claims 2 to 5 or 1, wherein said secondary-air intake pipe comprises a flexible and elastic pipe and a metal wire helically wound around the outer periphery of said flexible and elastic pipe.

7. A device as set forth in claim 1, wherein said engine has a plurality of cylinders formed in said cylinder block, and said reed valve means includes a plurality of reed valve devices corresponding to said cylinders.

8. A device as set forth in claim 7, wherein each of said reed valve devices comprises a reed valve chamber and a reed valve dividing said reed valve chamber into an upstream chamber, said reed valve a downstream chamber and being adapted to be opened and closed by the pulsating exhaust gas, and wherein said inlet passage is open to said upstream chamber and said outlet passage is open to said downstream chamber.

9. A device as set forth in claim 8, further comprising a secondary-air distributing passage provided above said upstream chambers to connect said inlet passages to said secondary-air intake passage.

10. A device as set forth in claim 7, further comprising air-flow gaps defined between opposing surfaces of said cylinder block and said reed valve devices, and a plurality of cooling passages formed between the neighboring cylinders and communicated with said air-flow gaps.

* * * * *